Dec. 4, 1956 D. M. CHAUVIN 2,773,222

RELAY ACTUATING CIRCUIT

Filed May 14, 1954

WITNESSES:
E. A. McCloskey.
T. H. Murray

INVENTOR
David M. Chauvin.
BY
F. E. Browder
ATTORNEY

United States Patent Office 2,773,222

Patented Dec. 4, 1956

2,773,222

RELAY ACTUATING CIRCUIT

David M. Chauvin, Glen Burnie, Md., assignor to Westinghouse Electric Corporation, East Pittsburgh, Pa., a corporation of Pennsylvania Application May 14, 1954, Serial No. 429,956

2 Claims. (Cl. 317—149)

My invention relates to circuits for relay-keying of signal-transmitting systems which employ communication codes comprising dots and dashes or other on-off type signals. In such systems, the dot or dash signal received through a transmission-line or system actuates a solenoid-operated switch or relay. In any such system "noise" currents and voltages are inevitable, and so the relay must be so designed that it is not actuated to closed position in response to line-currents of the highest noise level, but will hold it securely in closed position as long as the line-current stays above a slightly higher current level which the line delivers at the relay whenever the distant operator's signal-switch is closed. In short, the switch-actuating relay must remain open as long as the transmission-channel current lies below a first level, and remain closed as long as the channel current stays above a second level; and for general economic reasons these two levels should not be too far apart; for example the lower may be not less than eighty percent of the latter.

However, as is well-known in the electrical art, alternating currents of frequencies well-suited to signal-transmission channels are poorly adapted to operation of mechanical relays; hence electron-tube amplifiers are interposed between the transmission channel and the mechanical relay. In these amplifiers, the output current produced by transmission-channel noise currents, which are below the first level mentioned above, must be insufficient to move the mechanical relay from open-circuit to closed-circuit position; and the output currents produced by channel currents above the second level must be sufficiently large to hold the relay in closed-circuit position in spite of any jarring or mechanical shock it is likely to be subjected to in usual service. The ratio of the current just sufficient to move a mechanical relay to closed position to the current just sufficient to hold the relay closed in the face of usual mechanical shocks should be fairly low if the relay is to be of an economical design; thus the current sent into the relay from the amplifier output when the transmission-channel current is at the relay-closing value should preferably be not over forty percent of the amplifier output current when the channel current is at the relay-holding value. It will be seen that these relations impose certain requirements on the voltage input vs. current output characteristics of the electron amplifier; that is to say, an increase of about twenty-five percent (i. e. from 80% to 100%) of the input volts must cause an increase of about one hundred and fifty percent (i. e. from 40% to 100%) in output current. One of the principal features of my invention is the provision of an electronic amplifier having such an input vs. output characteristic. Furthermore, unless a rectifier is to be interposed between the amplifier and the relay, the electronic amplifier must be a "D.-C. amplifier" having these characteristics.

The foregoing will be seen to be tantamount to the requirement that the electronic amplifier shall have an input-voltage (abscissa) vs. output current (ordinate) characteristic of the shape of the curves in Fig. 1 of the drawings. The line marked 22 thereon indicates the current which just suffices to close the relay and the line 21 indicates the minimum current capable of holding the relay closed in spite of any probable mechanical shock or jar to which it is liable in use.

Another requirement is that it be possible to adjust the threshold value of the input signal which results in closure of the keying relay over a range of value that is wide compared with the difference between the line-input voltage which just suffices to close the relay contacts and the line-input voltage which just suffices to hold the relay closed; this difference, which is proportional to the slope of the rising portion of the curves, I will refer to as the differential.

A further requirement of the amplifier is that the slope of the rising portions of the curves shall be the same throughout the range over which the threshold current is adjustable.

Yet another requirement of the amplifier is that the tendency of the mechanical relay contacts to "bounce" open when moved from open to closed position should be minimized.

One object of my invention is accordingly to produce a new and improved system for closing and opening a mechanical relay in response to intermittent pulses of control voltage.

Another object is to provide a novel arrangement for closing and opening a mechanical relay in response to control voltages in which the control voltage required to hold the relay closed against mechanical shock and jar is only slightly less than that which suffices to move the relay from open to closed position.

Another object is to provide a new and improved system embodying electronic means for closing and opening a mechanical relay in response to intermittent pulses of control voltage.

Another object is to provide a new and improved system embodying electronic means for closing and opening a mechanical relay in response to intermittent pulses of control voltage derived through rectifying pulsed high-frequency carrier current coming in over a transmission line.

Another object is to provide a system embodying an electronic component for closing and opening a mechanical relay in response to control voltages in which the threshold value of the control voltage which just suffices to move the relay to closed position may be readily adjusted by varying an element in the electronic component.

Another object is to provide a system embodying an electronic component for closing a mechanism in which the electronic component shall exert a damped force on the mechanism, thus minimizing any tendency of the latter to "bounce" on closing.

Another object is to provide a system for closing a mechanism in response to intermittent control voltage pulses in which the threshold voltage just sufficing to close the mechanism may be adjusted over a substantial range without changing the differential.

Another object is to provide an electronic amplifier adapted for closing and opening a mechanism in response to pulses of control voltage which shall have an input voltage vs. output current characteristic having a sharp slope of output current per input volt over a substantial input voltage range, but practically zero slope of output current per input volt over a lower voltage range.

Another object is to provide an amplifier of the type described in the immediately preceding paragraph in which said lower range substantially covers the range of unwanted fluctuations of the lower values of said control voltage.

Another object is to provide an amplifier of the type described in the paragraph before the last in which the value of the control voltage at which said sharp slope begins may be varied at will over a substantial range without varying the magnitude of said slope.

Still another object is to provide an amplifier of the type described in the second paragraph before the last which shall have a heavily damped output current.

Other objects of my invention will become apparent upon reading the following description, taken in connection with the drawings, in which.

Figure 2:
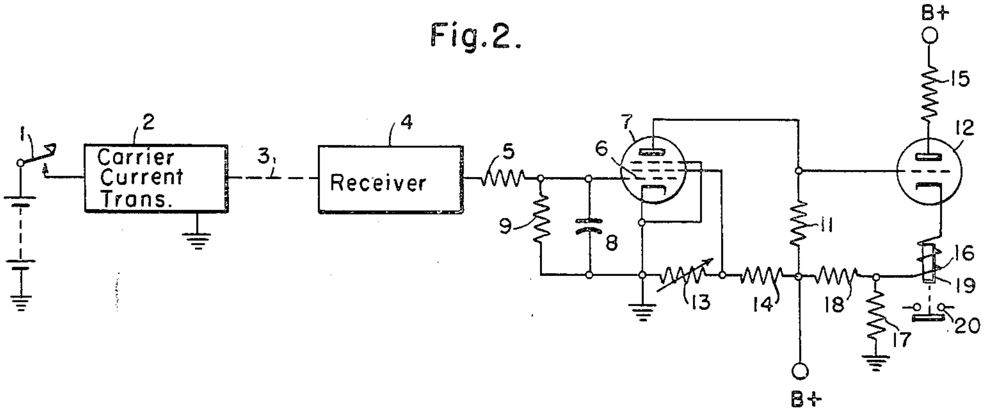
Fig. 2 is a schematic diagram of a keying relay circuit used to illustrate the principles of my invention.

Since it is believed that Fig. 1 has already been sufficiently described in the foregoing discussion of the invention, attention will be given to the details of Fig. 2. Signal or other control variations may be impressed on a transmission system at a control point symbolized by a signal key 1 and these variations may, in ways too well-known in the arts to require detailed descriptions, control the output of a carrier current transmitter 2 sending modulated energy into a transmission channel symbolized here by the transmission line 3, whence it passes through a suitable receiver 4 whose rectified output voltage is impressed through a suitable resistor 5 on the control electrode 6 of an electron tube 7 having at least two grids, and which preferably is a pentode. The cathode of the tube 7 is grounded and connected to its control grid 6 by a grid condenser 8 and resistor 9. The anode of tube 7 is connected through a resistor 11 to the positive pole B+ of a direct-current voltage source (not shown) which has its negative pole grounded, and is also connected to the control grid of an electron tube 12, which is preferably a triode.

The cathode of tube 7 is connected through an adjustable resistor 13 and a resistor 14 to the positive pole B+, and the common junction of resistors 13 and 14 is connected to the screen grid of the tube 7.

The anode of tube 12 is connected through a resistor 15 to the positive terminal B+, while the cathode of tube 12 is connected to ground through the actuating winding of a mechanism symbolized by a relay 16, in series with a resistor 17. A resistor 18 connects the common junction of relay 16 and resistor 17 to the positive terminal B+.

Figure 1:
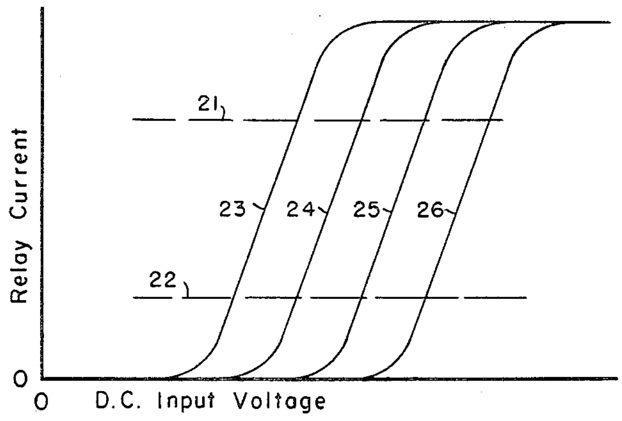
Figure 1 is a graph useful in explaining the principles of my invention.

The curves of Fig. 1 show the relationship between the input voltage (abscissa) impressed by receiver 4 on control grid 6 of tube 7 and the output current (ordinate) flowing from tube 12 into relay 16. Different individual curves 23 through 26 correspond to different settings of adjustable resistor 13, curve 23 corresponding to a low value of resistor 13 and curves 24, 25 and 26 to successively higher values.

I have found that by making the resistor 11 large compared with the plate-resistance $R_p$ of the tube 7 (e. g. of the order of 10 times $R_p$ of tube 7), so that the anode of tube 7 operates at only a small fraction of the voltage of positive terminal B+, while making the value at its maximum resistance of resistor 13 only a small fraction (e. g. one-tenth) of the resistance of resistor 14, volt-ampere characteristics of the desired shape, as shown at 23, 24, 25, 26 in Fig. 1, are attained. This relationship of the resistors 11, 13 and 14 is found to produce substantially the same slope in these curves over a substantial range of adjustment of resistor 13.

By using such a voltage (e. g. 250 volts D.-C.) at positive pole B+ that tube 7 operates far below its rated maximum plate current, the curve 23 which corresponds to a low value of resistor 13, leaves the zero-current axis at a cut-off input voltage higher than that impressed on grid 6 by "static" or other unwanted "noise" voltages in the output of receiver 4. In other words, the "noise" may be rendered of no effect on the amplified output by proper adjustment of resistor 13 relative to resistor 14.

In absence of an input signal, the current flow through tube 12 and relay 16 is zero and the ratio of resistor 17 to resistor 18 fixes the potential above ground of the cathode of tube 12 above that of the anode of tube 7. When an arriving signal pulse so raises the potential of the grid of tube 12 that it conducts current, this current, passing through resistor 17, raises the potential of the cathode of tube 12 and so damps the magnitude of current flowing through relay 16 from tube 12. This automatically prevents the current in relay 16 from rising to a value sufficiently to violently "bounce" its armature 19 against its output contact 20. I have accordingly provided an electronic amplifier of a type which minimizes "bounce" in the relay 16.

To give a specific instance of the use of the principles of my invention, the tubes 7 and 12 may be parts of a 6U8 tube, the resistors may have the following values in ohms: #9—$6.8\times10^4$; #11—$4.7\times10^6$; #13—$10^4$ max.; #14—$10^5$; #15—$1.5\times10^4$; #17—4700; #18—$6.8\times10^4$; the winding of relay 16 has a resistance of 5,000 ohms; the capacitor #8—$4.7\times10^{-9}$ farads; and the voltage-to-ground of terminal B+ is 250 volts D.-C. The current in the relay coil 16 at closure is 3 ma. and at opening is 1.4 ma.

I claim as my invention:

1. In combination with a source of voltage pulses, a first electron discharge device having an anode, cathode and at least two grids included therein, one of said grids being a control grid, means for applying said voltage pulses to said control grid, a plate circuit for said discharge device, a first resistor of a magnitude in the order of ten times the plate resistance of said discharge device included in said plate circuit, a second electron discharge device having an anode, a cathode and grid included therein, a connection between the side of said first resistor nearest the anode of said first discharge device and the grid of said second device, means including the energizing coil of a relay and a resistive impedance element in series connecting the cathode of said second device to the other side of said first resistor, a further impedance element connecting the junction of said coil and said first-mentioned impedance element to the cathode of the first electron discharge device, a second resistor connecting the cathode of said first device to the other grid of said first device, and a third resistor of a magnitude in the order of ten times the magnitude of said second resistor connecting said other grid to said other side of the first resistor.

2. In combination with a source of voltage pulses, a first electron discharge device having an anode, cathode and at least two grids included therein, means for applying said voltage pulses to the one of said grids nearest said cathode, a terminal adapted for connection to the positive side of an anode voltage source, the negative side of said voltage source being grounded, a first resistor of a magnitude in the order of ten times the internal impedance of said discharge device connecting said anode to said terminal, means connecting said cathode to ground, a second resistor connecting said other grid to ground, a third resistor of a magnitude in the order of ten times the magnitude of said second resistor connecting said other grid to said terminal, a second electron discharge device having an anode, a cathode and a grid included therein, a connection between the anode of said first device and the grid of said second device, means including a relay energizing coil and a fourth resistance in series connecting the cathode of said second device to ground, and a fifth resistance connecting the junction of said fourth resistance and said energizing coil to said terminal.

References Cited in the file of this patent

UNITED STATES PATENTS

| | | |
|---|---|---|
| 2,084,186 | Braden | June 15, 1937 |
| 2,343,753 | Davey | Mar. 7, 1944 |
| 2,564,823 | Wallace | Aug. 21, 1951 |
| 2,591,810 | Hart | Apr. 8, 1952 |